United States Patent
Bassett et al.

(10) Patent No.: US 10,825,262 B2
(45) Date of Patent: Nov. 3, 2020

(54) SYSTEMS AND METHODS FOR BEARING HEALTH MONITORING IN POWER PLANTS

(71) Applicant: GENERAL ELECTRIC COMPANY, Schenectady, NY (US)

(72) Inventors: Kenneth Brian Bassett, Greenville, SC (US); Sudeep Gowrishankar, Bangalore (IN); Ajay Behera, Bangalore (IN); Suleman Khoja, Atlanta, GA (US); Chaochao Chen, Atlanta, GA (US); Luis Sanchez Del Valle, Atlanta, GA (US); Renhua Wang, Atlanta, GA (US); Robert Scott Phillips, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 389 days.

(21) Appl. No.: 15/890,096

(22) Filed: Feb. 6, 2018

(65) Prior Publication Data
US 2019/0244439 A1    Aug. 8, 2019

(51) Int. Cl.
*G07C 3/00* (2006.01)
*G08B 21/18* (2006.01)
*F16C 19/52* (2006.01)

(52) U.S. Cl.
CPC ............. *G07C 3/00* (2013.01); *G08B 21/187* (2013.01); *F05D 2240/50* (2013.01);
(Continued)

(58) Field of Classification Search
CPC ......... G07C 3/00; G08B 21/187; F16C 19/52; F16C 2233/00; F05D 2270/334; F05D 2270/303; F05D 2240/50; F05D 2260/80
See application file for complete search history.

(56) References Cited

U.S. PATENT DOCUMENTS

| 313,363 A | 3/1885 | Olin |
| 401,759 A | 4/1889 | Rocheleau |

(Continued)

FOREIGN PATENT DOCUMENTS

| EP | 1258642 A2 | 11/2002 |
| WO | 2014/061140 A1 | 4/2014 |

*Primary Examiner* — Mohamed Charioui
(74) *Attorney, Agent, or Firm* — Eversheds Sutherland (US) LLP

(57) ABSTRACT

Embodiments of the disclosure can relate to bearing health monitoring in power plants. In one embodiment, a computer-implemented method for bearing health monitoring in power plants can include receiving operational data associated with a power plant component. The method may further include receiving training data from one or more power plants. The method may further include determining a signature associated with an anomaly event of the power plant component, based at least in part on the operational data and the training data. The anomaly event of the power plant component may include a wiping of a bearing or a scoring of a bearing. The method can further include generating (1) an alert indicative of the anomaly event or (2) an alert to modify an inspection interval for the power plant component, based at least in part on a comparison of the signature with a threshold signature. The method can further include generating a repair or inspection recommendation for the power plant component, based at least in part on the comparison.

17 Claims, 5 Drawing Sheets

(52) U.S. Cl.
CPC .... *F05D 2260/80* (2013.01); *F05D 2270/303* (2013.01); *F05D 2270/334* (2013.01); *F16C 19/52* (2013.01); *F16C 2233/00* (2013.01)

(56) References Cited

U.S. PATENT DOCUMENTS

| | | | |
|---|---|---|---|
| 403,849 A | 5/1889 | Martel | |
| 425,522 A | 4/1890 | Rivett | |
| 428,020 A | 5/1890 | Rawls | |
| 450,263 A | 4/1891 | Sylvia | |
| 506,010 A | 10/1893 | Mendelson | |
| 707,887 A | 8/1902 | Williams | |
| 858,876 A | 7/1907 | Koch | |
| 878,775 A | 2/1908 | Colbert | |
| 892,309 A | 6/1908 | Russell | |
| 904,847 A | 11/1908 | Cunningham | |
| 923,495 A | 6/1909 | Cunningham | |
| 926,123 A | 6/1909 | Koch | |
| 990,422 A | 4/1911 | Bowers | |
| 992,206 A | 5/1911 | Kendrick | |
| 996,053 A | 6/1911 | Bowers | |
| 996,054 A | 6/1911 | Bowers | |
| 1,045,487 A | 11/1912 | Williams et al. | |
| 1,191,041 A | 7/1916 | Stevens | |
| 1,539,890 A | 6/1925 | Williams | |
| 2,071,401 A | 2/1937 | Hansen | |
| 2,238,580 A | 4/1941 | Campbell | |
| 2,325,508 A | 7/1943 | Otto et al. | |
| 2,372,973 A | 4/1945 | Clarke | |
| 2,421,310 A | 5/1947 | Berlincourt | |
| 2,430,377 A | 11/1947 | Vorreyer | |
| 2,485,954 A | 10/1949 | Ellis | |
| 2,613,434 A | 10/1952 | Martin | |
| 2,653,493 A | 9/1953 | Sam | |
| 2,713,279 A | 7/1955 | Harris | |
| 2,881,646 A | 4/1959 | Farr et al. | |
| 3,444,606 A | 5/1969 | Jones | |
| 3,492,854 A | 2/1970 | Eppler | |
| 3,516,171 A | 6/1970 | Martin | |
| 3,588,982 A | 6/1971 | Ziegler, Jr. | |
| 3,630,068 A | 12/1971 | Floyd, Jr. | |
| 3,636,612 A | 1/1972 | Suprun | |
| 3,956,801 A | 5/1976 | Wood | |
| 4,091,531 A | 5/1978 | Grubb et al. | |
| 4,318,212 A | 3/1982 | Beak | |
| 4,428,105 A | 1/1984 | Abbott et al. | |
| 4,460,893 A | 7/1984 | Thomas et al. | |
| 4,897,001 A | 1/1990 | Rumpler | |
| 4,976,483 A | 12/1990 | Cunningham | |
| 4,998,312 A | 3/1991 | Donaldson | |
| D340,852 S | 11/1993 | Sanders et al. | |
| 5,377,768 A | 1/1995 | Smith | |
| D395,808 S | 7/1998 | Loucks | |
| 5,829,113 A | 11/1998 | Socci et al. | |
| 5,979,036 A | 11/1999 | Socci et al. | |
| 7,017,962 B2 | 3/2006 | Toensing | |
| 7,231,303 B2 | 6/2007 | Griessler et al. | |
| 7,600,407 B2 | 10/2009 | Nguyen | |
| 8,292,281 B1 | 10/2012 | Smith | |
| 2002/0038566 A1 | 4/2002 | Jokisch | |
| 2002/0105429 A1* | 8/2002 | Donner | F16C 19/525 340/682 |
| 2004/0036062 A1 | 2/2004 | Toensing | |
| 2004/0154812 A1 | 8/2004 | McDonald | |
| 2004/0250623 A1 | 12/2004 | Walker et al. | |
| 2005/0119840 A1* | 6/2005 | Astley | G01M 13/045 |
| 2006/0090911 A1 | 5/2006 | Laramee | |
| 2007/0192063 A1* | 8/2007 | Abu-El-Zeet | G05B 17/02 702/182 |
| 2007/0198219 A1* | 8/2007 | Havela | G01H 1/003 702/187 |
| 2008/0163915 A1 | 7/2008 | Wobrock | |
| 2009/0266073 A1 | 10/2009 | Greentree | |
| 2009/0315005 A1 | 12/2009 | Hironaga et al. | |
| 2010/0292937 A1* | 11/2010 | Hosny | G01M 13/045 702/34 |
| 2012/0079448 A1 | 3/2012 | Cope et al. | |
| 2012/0109569 A1* | 5/2012 | Padinharu | F16C 33/1025 702/130 |

* cited by examiner

SYSTEMS AND METHODS FOR BEARING HEALTH MONITORING IN POWER PLANTS

TECHNICAL FIELD

Embodiments of this disclosure generally relate to power plants, and more specifically, to systems and methods for bearing health monitoring in power plants.

BACKGROUND

Power plants may be designed to generate power continuously. Unplanned outages due to maintenance issues related to bearing failures in power plant components can be expensive for power plant operators. Physical inspection of bearings for potential defects may also be expensive and time consuming. Early identification of bearing anomalies can help reduce unplanned outages and need for physical inspection.

BRIEF DESCRIPTION OF THE DISCLOSURE

Some or all of the above needs and/or problems may be addressed by certain embodiments of the disclosure. Certain embodiments may include systems and methods for bearing health monitoring in power plants. According to one embodiment of the disclosure, a computer-implemented method can be provided. The method may include receiving operational data associated with a power plant component. The method may further include receiving training data from one or more power plants. The method may further include determining a signature associated with an anomaly event of the power plant component, based at least in part on the operational data and the training data. The anomaly event of the power plant component may include a wiping of a bearing or a scoring of a bearing. The method can further include generating (1) an alert indicative of the anomaly event or (2) an alert to modify an inspection interval for the power plant component, based at least in part on a comparison of the signature with a threshold signature. The method can further include generating a repair or inspection recommendation for the power plant component, based at least in part on the comparison.

According to another embodiment of the disclosure, a system can be provided. The system may include a processor. The system can also include a memory with instructions executable by a computer for performing operations that can include: receiving, via the processor, operational data associated with a power plant component; receiving, via the processor, training data from one or more power plants, based at least in part on the operational data and the training data; determining, via the processor, a signature associated with an anomaly event of the power plant component, wherein the anomaly event may include a wiping of a bearing or a scoring of a bearing; based at least in part on a comparison of the signature with a threshold signature, generating (1) an alert indicative of the anomaly event or (2) an alert to modify an inspection interval for the power plant component; and based at least in part on the comparison, generating a repair or inspection recommendation for the power plant component.

According to another embodiment of the disclosure, a non-transitory computer-readable storage medium can be provided. The non-transitory computer-readable medium can include instructions executable by a computer for performing operations that can include: receiving operational data associated with a power plant component; receiving training data from one or more power plants; based at least in part on the operational data and the training data, determining a signature associated with an anomaly event of the power plant component, wherein the anomaly event includes a wiping of a bearing or a scoring of the bearing; based at least in part on a comparison of the signature with a threshold signature, generating (1) an alert indicative of the anomaly event or (2) an alert to modify an inspection interval for the power plant component; and identifying a repair or inspection recommendation for the power plant component.

Other embodiments, features, and aspects of the disclosure will become apparent from the following description taken in conjunction with the following drawings.

BRIEF DESCRIPTION OF THE DRAWINGS

Figure 1:
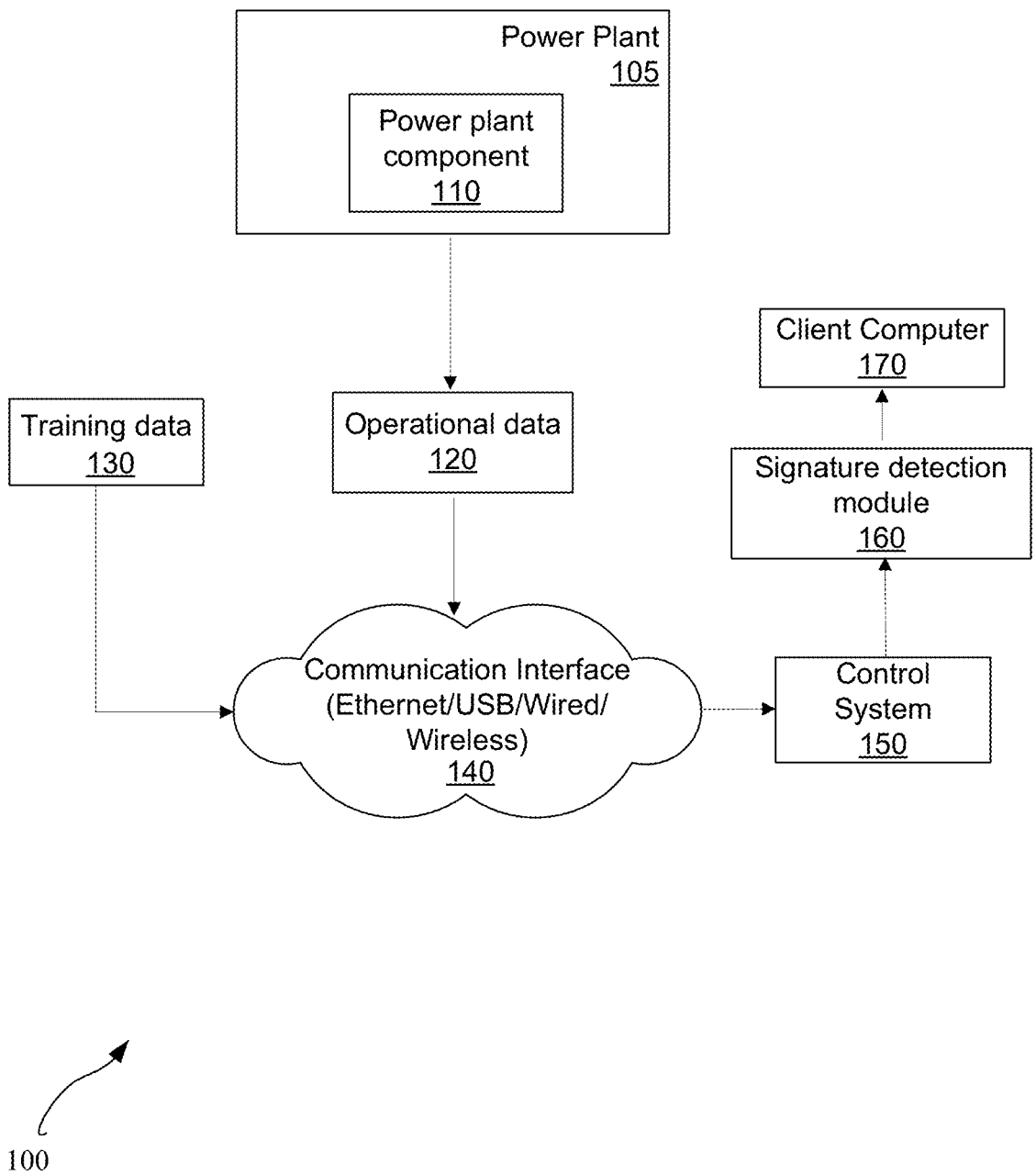

Having thus described the disclosure in general terms, reference will now be made to the accompanying drawings, which are not necessarily drawn to scale, and wherein:

FIG. 1 illustrates an example system environment for bearing health monitoring in power plants in accordance with certain embodiments of the disclosure.

Figure 2:
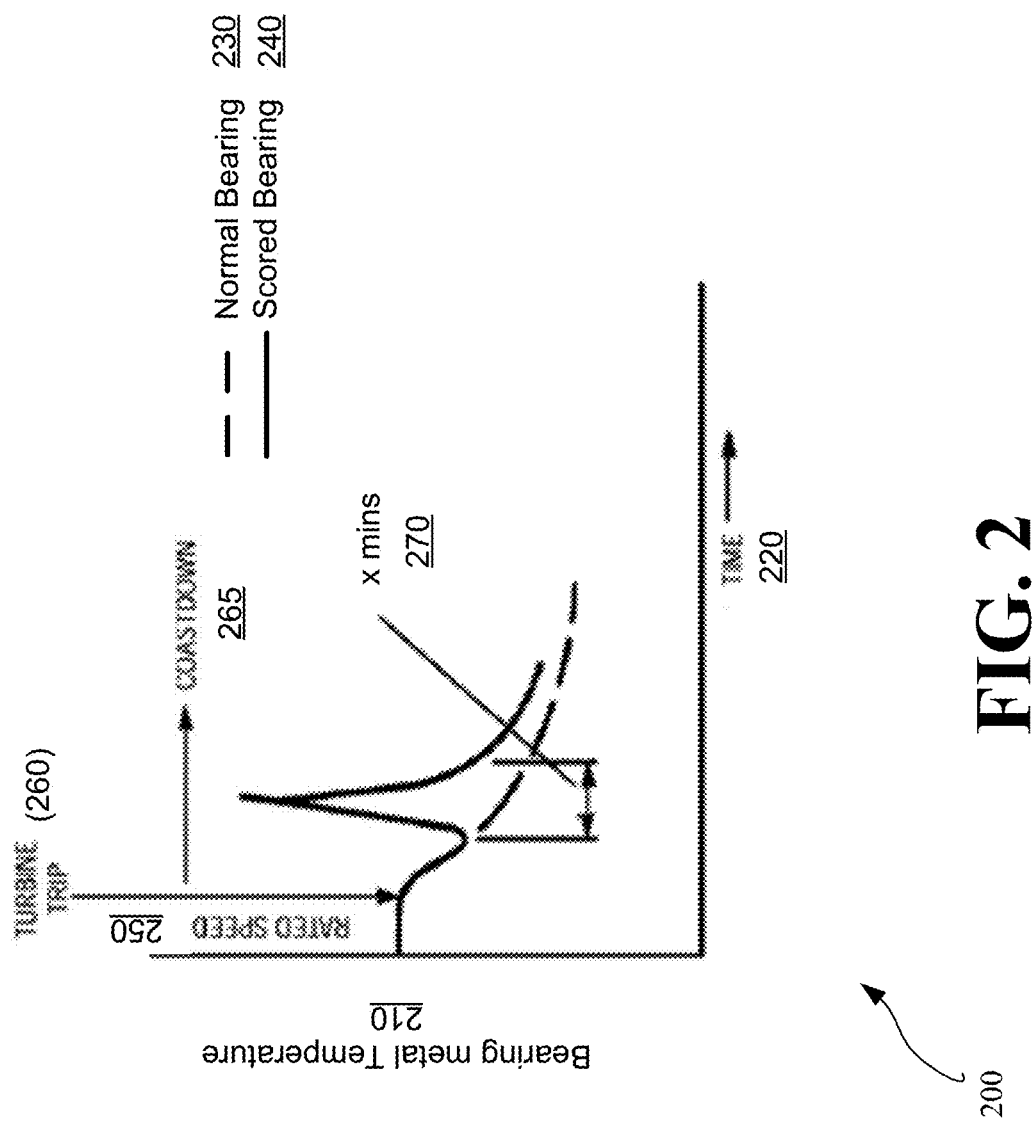

FIG. 2 illustrates an example signature event in a bearing in accordance with certain embodiments of the disclosure.

Figure 3:
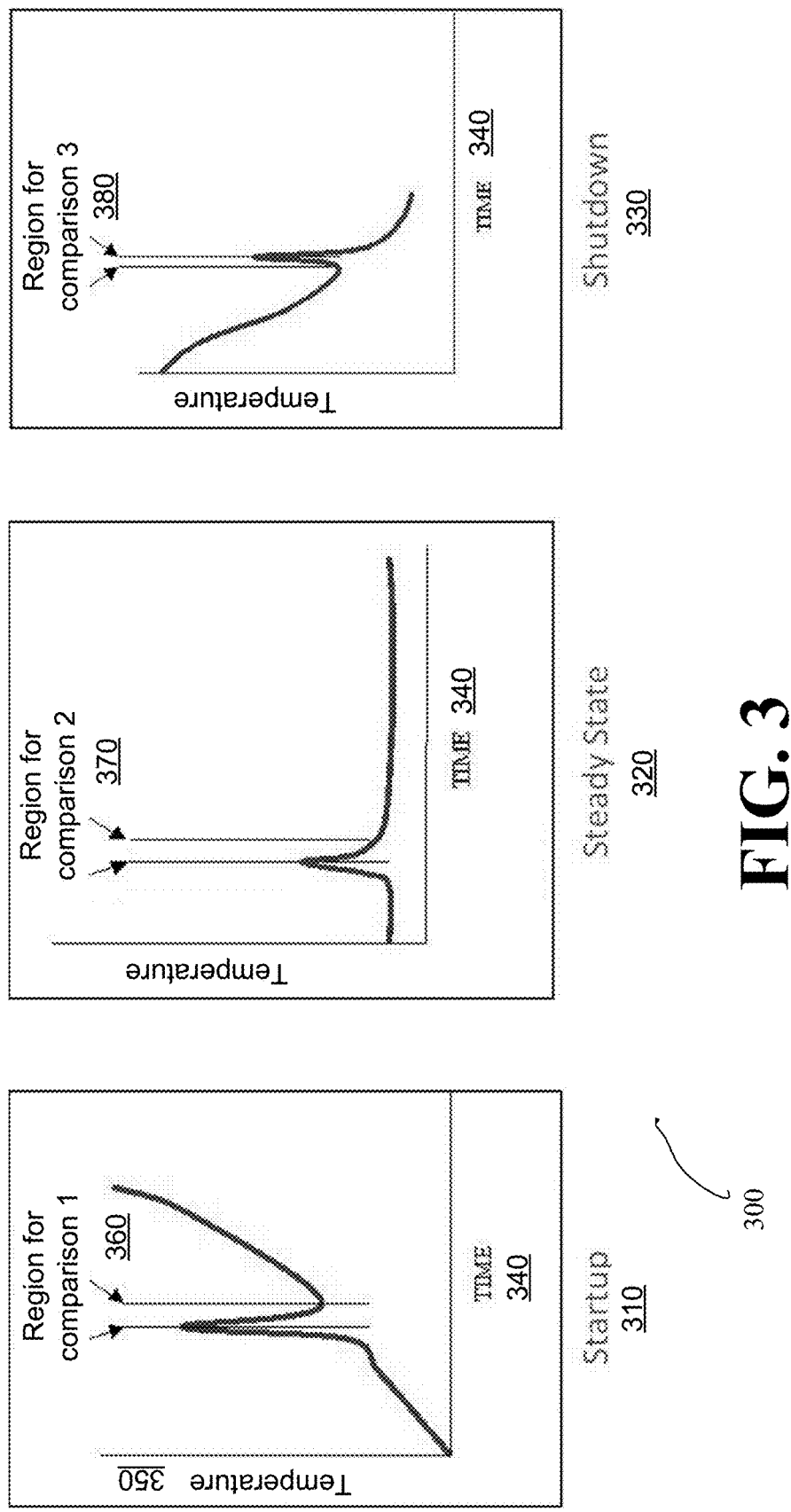

FIG. 3 illustrates example signature events in a bearing during various modes of power plant operation in accordance with certain embodiments of the disclosure.

Figure 4:
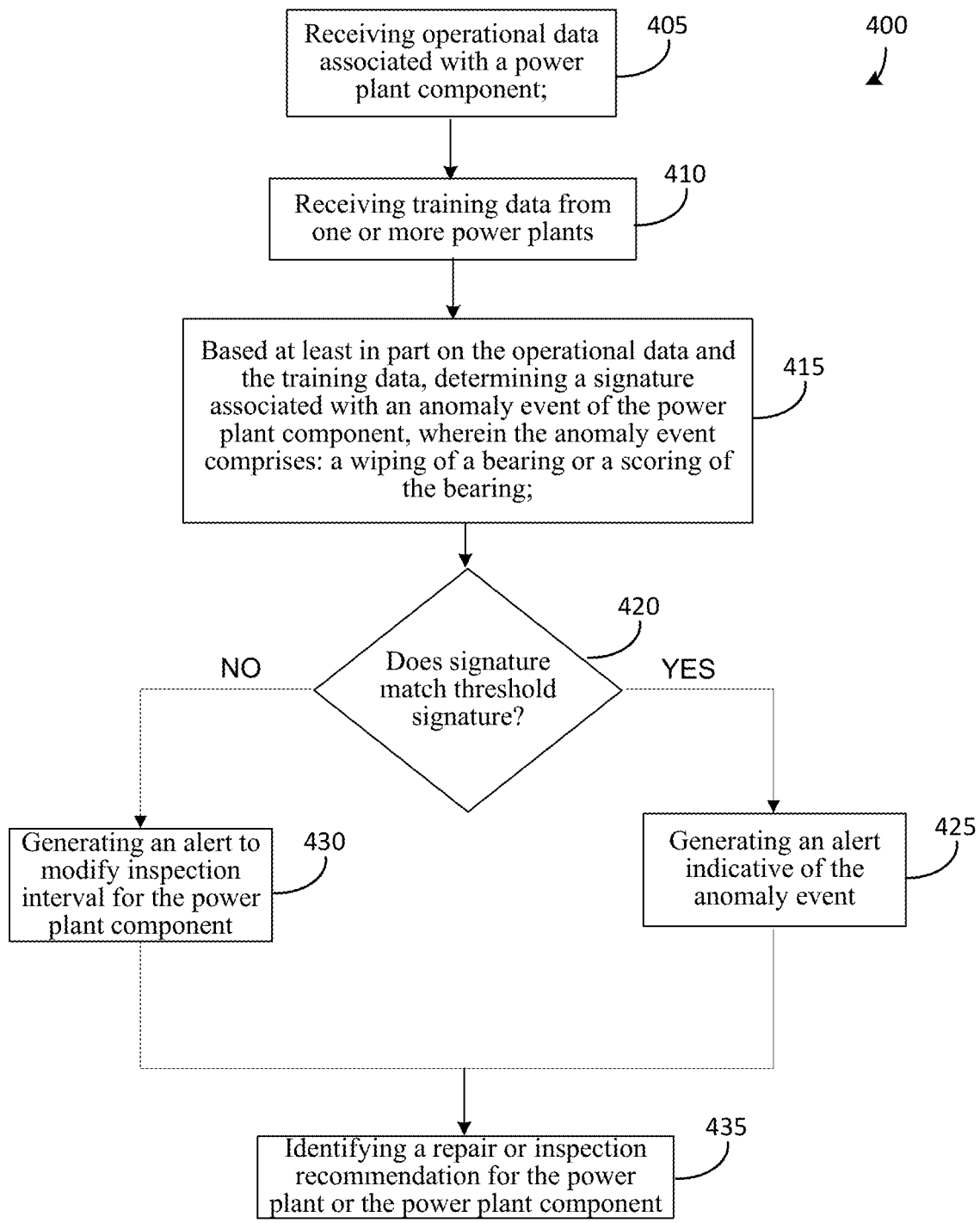

FIG. 4 illustrates an example flowchart of a method for bearing health monitoring in power plants in accordance with certain embodiments of the disclosure.

Figure 5:
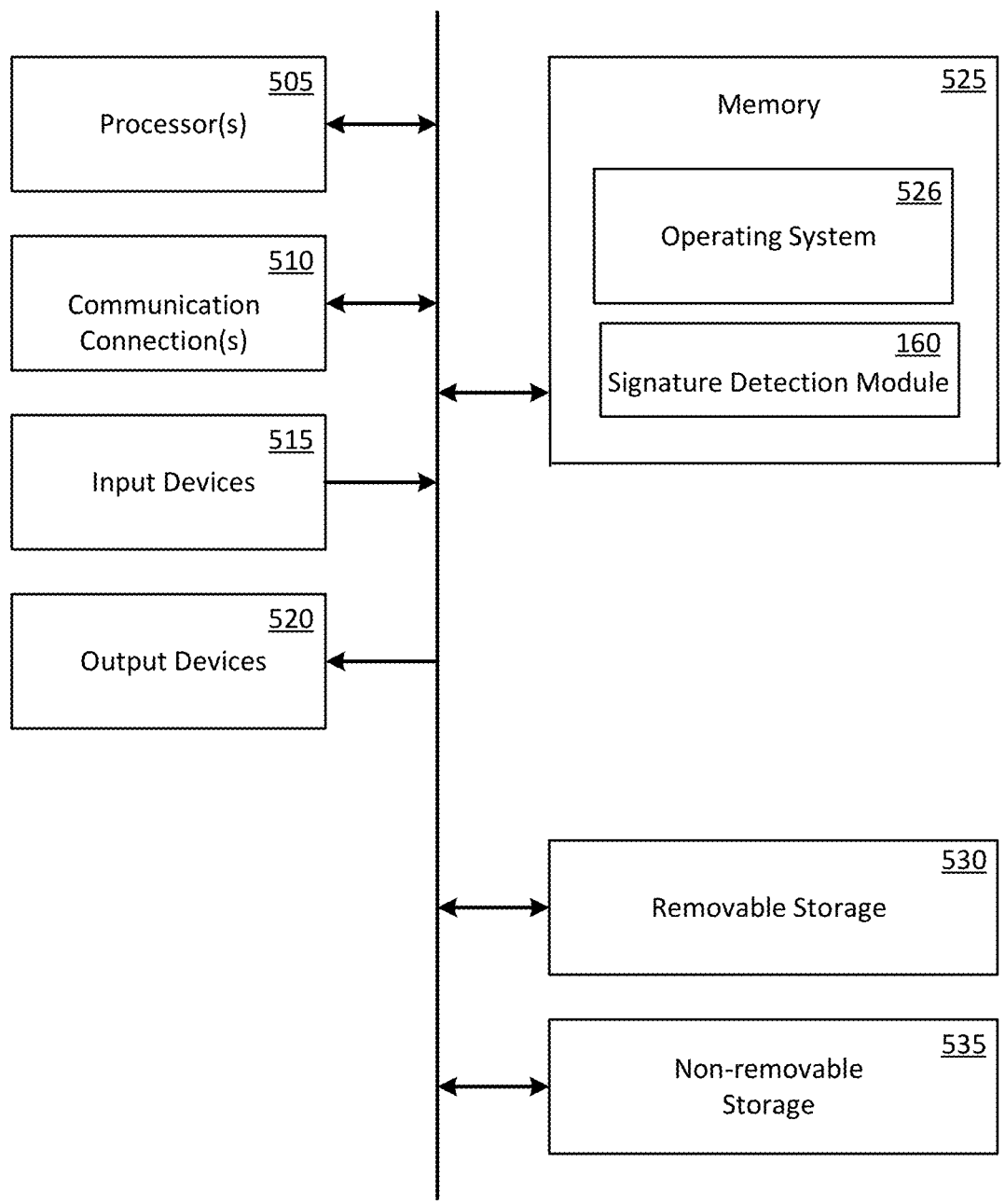

FIG. 5 illustrates an example control system configured for providing systems and methods for bearing health monitoring in power plants in accordance with certain embodiments of the disclosure.

The disclosure now will be described more fully hereinafter with reference to the accompanying drawings, in which example embodiments of the disclosure are shown. This disclosure may, however, be embodied in many different forms and should not be construed as limited to the example embodiments set forth herein; rather, these example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. Like numbers refer to like elements throughout.

DETAILED DESCRIPTION

The following detailed description includes references to the accompanying drawings, which form part of the detailed description. The drawings depict illustrations, in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents. Like numbers refer to like elements throughout.

Certain embodiments described herein relate to systems and methods for bearing health monitoring in power plants. For example, as will be described in greater detail herein, operational data associated with a power plant may be received; training data from one or more power plants may also be received; based at least in part on the operational data and the training data, a signature associated with an anomaly event of the power plant component may be determined. The anomaly event may include a wiping of a bearing or a scoring of the bearing; based at least in part on a comparison of the signature with a threshold signature, one of two alerts may be generated (1) an alert indicative of the anomaly event or (2) an alert to modify an inspection interval for the power plant component; and a repair or inspection recommendation for the power plant component may be identified.

One or more technical effects associated with certain embodiments herein may include, but are not limited to, bearing health monitoring and identifying misoperation in bearings, including wiping of a bearing or Babbitt, or scoring of a bearing or babbitt. Monitoring health of bearings and identifying misoperation in bearings can enable a customer to proactively plan outages to repair or replace bearings and avoid potentially lengthy unplanned outages. Certain embodiments herein may also have a technical effect of modifying maintenance intervals associated with bearings by identifying a lack of bearing anomalies. Certain other embodiments herein may also have a technical effect of minimizing possible false positive results in predicting bearing anomalies. The following provides detailed description of various example embodiments related to systems and methods for bearing health monitoring in power plants.

FIG. 1 depicts an example system 100 to implement certain methods and systems for bearing health monitoring of a bearing associated with a power plant component, such as power plant component 110, in a power plant 105. According to an example embodiment of the disclosure, the power plant 105 may include one or more power plant components 110. The one or more power plant components 110 may include one or more power producing equipment, such as a gas turbine, a steam turbine or a reciprocating engine. The one or more power plant components 110 may also include one or more generators coupled to the one or more power producing equipment. The one or more generators and the one or more power producing equipment of system 100 may include bearings that may support a weight of one or more shafts while reducing friction. System 100 may also include one or more controllers, such as the control system 150, that may control the power plant 105 and/or the power plant component 110. The system environment 100, according to an embodiment of the disclosure, can further include operational data 120 that can receive data from sensors associated with the power plant 105 or the power plant component 110, training data 130 from one or more power plants, a communication interface 140, a signature detection module 160, and a client computer 170.

Referring again to FIG. 1, the bearings associated with the power plant component 110 may include, for example, journal bearings, thrust bearings, and so on. These bearings may include a babbitt lining (also referred to as "babbitt") which may sacrificially reduce wearing of an actual metal of the bearings.

The operational data 120 and the training data 130 may include discrete data and time series data. For example, operational data 120 may include time series data such as bearing metal temperature data, lube oil temperature data, drain oil temperature data, seismic vibration data, proximity vibration data, turbine power output data, turbine speed data, and so on. Operational data 120 may also include other parameters associated with the power plant component 110, such as, operational hours, operating time in specific modes of operation, and so on. In another embodiment of the disclosure, discrete data associated with the training data 130 may include mean time between failure (MTBF) of bearings similar to the bearings associated with the power plant component 110. Discrete data associated with training data 110 may also include data regarding failure events and anomalous operational events associated with bearings similar to bearings associated with power plant component 110. In an example embodiment of the disclosure, training data 130 may include a set of data from bearings that have similar configuration to the bearings associated with power plant component 110. The operational data 120 may also include data representing bearing operation associated with power plant component 110 at a current time or from a prior operating time, such as, for example, operation from 1 week prior to current time, operation from 2 weeks prior to current time, and so on.

The control system 150 can be communicatively coupled to receive operational data 120 and training data 130 via a communication interface 140, which can be any of one or more communication networks such as, for example, an Ethernet interface, a universal serial bus (USB) interface, or a wireless interface. In certain embodiments, the control system 150 can be coupled to the operational data 120 and training data 130 by way of a hard wire or cable, such as, for example, an interface cable.

The control system 150 can include a computer system having one or more processors that can execute computer-executable instructions to receive and analyze data from various data sources, such as the operational data 120, and training data 130 and can include the signature detection module 160. The control system 150 can further provide inputs, gather transfer function outputs, and transmit instructions from any number of operators and/or personnel. The control system 150 can perform control actions as well as provide inputs to the signature detection module 160. In some other embodiments, the control system 150 may determine control actions to be performed based on data received from one or more data sources, for example, from the operational data 120 or training data 130. In other instances, the control system 150 can be an independent entity communicatively coupled to the signature detection module 160.

In accordance with an embodiment of the disclosure, a system for bearing health monitoring in power plants may be provided. The system 100 may include a power plant 105, a power plant component 110, and a controller 150. The controller 150 can include a memory that can contain computer-executable instructions capable of receiving at least one signal from the power plant 105 or the power plant component 110. The data received may be represented by operational data 120 of FIG. 1. Furthermore, training data 130 from one or more power plants may be received. Based at least in part on the operational data 120 and the training data 130, a signature associated with an anomaly event of the power plant component 110 may be determined. The anomaly event may include a wiping of a bearing associated with the power plant component 110 or scoring of a bearing associated with the power plant component 110. The signature associated with the anomaly event may be a characteristic spike in time series data for an operational parameter associated with the operation of the power plant component 110, such as, for example, a bearing metal temperature spike, a vibration spike, and so on. The signature associated with a wiping or scoring of a bearing can be associated with a characteristic amplitude and a characteristic duration. In an example embodiment of the disclosure, the signature associated with the anomaly event of the power plant component may be characterized by a length or duration parameter, a height or amplitude parameter, or a rate of change parameter. Based on these parameters, a signature may be determined to be associated with a particular anomaly event of the power plant component, for instance, of a wiping of a bearing.

The signature associated with the anomaly event of the power plant component 110 may be determined manually, at the signature detection module 160, or by the control system 150. The signature may then be compared to a threshold signature. The threshold signature may be indicative of a signature with a characteristic amplitude, a characteristic duration, and a characteristic rate of change for a bearing similar to the bearing associated with the power plant component 110. The threshold signature may be based at least in part on operational data 120 and training data 130 from one or more power plants.

The signature associated with the anomaly event may be determined on a real-time continuous basis. For example, the signature may be determined continuously during operation of the power plant component 110 when the power plant 105 is operational, such as, for example, during startup operation of the power plant, steady state operation of the power plant, shut down operation of the power plant and so on. In another example embodiment of the disclosure, the signature may be determined on a discrete time interval basis. For example, the signature may be determined every 2 hours, every 4 hours, every 8 hours, and so on, irrespective of the power plant component's 110 operational status. The signature may also be determined when the power plant 105 is shut down, so that the power plant component 110 is at minimum speed or at turning gear speed.

Referring again to FIG. 1, the memory associated with the controller 150 can further contain computer-executable instructions capable of comparing the determined signature to a threshold signature. Based at least in part on the comparison, one of two alerts may be generated: (1) an alert indicative of the anomaly event or (2) an alert to modify an inspection interval for the power plant component 110. By way of an example, if the comparison indicates that the determined signature matches the threshold signature in amplitude, duration and rate of change based on a predetermined level of those matching parameters, an alert indicative of the anomaly event may be generated. For example, the determined signature may match the signature associated with an anomaly event of a wiping of a bearing or wiping of a babbit associated with a generator bearing. In this case, the alert may indicate a wiping event in the generator bearing. By way of another example, if the comparison indicates that the determined signature may not match the threshold signature within a pre-determined level of those matching parameters, an anomaly event may not be indicated. In another example embodiment of the disclosure, the comparison may be carried out at the end of a maintenance cycle. In this scenario, an alert may be issued to modify an inspection interval associated with the power plant component 110. For example, if a bearing inspection for a bearing associated with a gas turbine has an inspection interval of x operating hours and if the comparison does not indicate the occurrence of an anomaly event, an alert indicating modification of the inspection interval for the bearing associated with the gas turbine may be issued. By way of an example, the inspection interval may be modified to x+y operating hours, where y is a predetermined number of operating hours based on empirical data.

The alert may be outputted via a client device, for example, the client computer 170 as indicated in FIG. 1. Based at least in part of the comparison, a repair or inspection recommendation for the bearing associated with the power plant component 110 can then be identified. For example, for a bearing associated with a gas turbine, if the comparison of the signature to the threshold signature indicates a match within the pre-determined level of matching parameters, the client may get information to make a decision to inspect or repair the bearing. Furthermore, the identified repair or replacement recommendation for the power plant component 110 can be performed by or otherwise implemented by the control system 150.

Referring again to FIG. 1, the control system 150 or the signature detection module 160 can also include software and/or hardware to determine the signature associated with the anomaly event associated with operation of the power plant component 110. This may include executing an algorithm that can analyze the operational data 120 and the training data 130. The algorithm may include filtering bad data from the operational data 120 associated with the power plant component 110 using one or more low pass filters or using turbine load. Filtering may remove, for example, non-operational data and anomalous data, and may provide a set of focused data for further processing. For instance, if a wiping event associated with a bearing is not expected during turning gear operation of the turbine at zero load, any data indicating a wiping event during this condition may be removed. Alternatively, if a bad temperature sensor indicates high bearing temperature when in reality it was normal, such data may be removed from the data set to be analyzed using a low pass filter. Applying a low pass filter may result in data smoothing of the operational data 120.

Furthermore, the algorithm may include removing false signature data using drain oil temperature and turbine speed data. For instance, high drain oil temperatures may create bearing wipe like signatures that may be removed by analyzing the drain oil temperature. Also, turbine speed may have certain critical speeds that cause signatures similar to bearing wipe signature. Alternatively, startup and shutdown of the power plant may create turbine wipe like signature that may be need to be removed. Operational data 120 thus cleaned may then be processed further in the algorithm.

The algorithm may further include implementing one or more additional low pass filters on the smoothed and cleaned operational data 120. Several low pass filter methods may be used, including a simple moving average type low pass filter. In an example embodiment of the disclosure, each available time series data based on operational data 120, such as, for example, bearing metal temperature data, may be passed through 4 low pass filters. The 4 low pass filters may be divided into two sets of 2 low pass filters, with each set having one low pass filter with a higher cut-off frequency that the other. The first set of low pass filters may run through the time series data forward in time, and the second set of low pass filters may run through the time series data backwards in time. A difference between filtered data of the first set of low pass filters, named forward shift detection score, may be calculated. A difference between filtered data of the second set of low pass filters, named backward shift detection score, may also be calculated. The forward shift detection score and the backward shift detection score may then be superimposed on each other. Based at least in part on the superimposed shift detection score, one or more patterns may emerge that may indicate a signature of an anomaly event associated with the power plant component 110.

The data processing step with 4 low pass filters as described in the previous section is by way of an example only. In other embodiments of the disclosure, any number of low pass filters may be implemented dependent on data availability and accuracy requirements.

The algorithm may further include applying various statistical methods, such as step detection, ramp detections and spike detection separately to the superimposed shift detection score. For instance, a step detection method may identify the duration of a signature associated with an anomaly event. As another example, a ramp detection method may identify the rate of change associated with a signature associated with an anomaly event. In another example embodiment of the disclosure, a spike detection method may be used to identify an amplitude of a signature associated with an anomaly event.

Attention is now directed to FIG. 2, which depicts an example signature 200 for an anomaly event in an example embodiment of the disclosure. The example signature profile 200 indicates bearing metal temperature on the y-axis as a function of time on the x-axis for a turbine coast down event. Turbine coast down 265 is triggered at the turbine trip 260 indicator, before which the turbine may be maintained at a rated speed 250. Bearing metal temperatures 210 as a function of time 220 for a normal bearing 230 and a scored bearing 240 are indicated in FIG. 2. As indicated in FIG. 2, while a normal bearing 230 may indicate a gradual drop in bearing metal temperature 210 once turbine trip 260 is initiated, in the case of a scored bearing 240, the bearing metal temperature may have a spike of a certain amplitude of bearing metal temperature 210 and may last for a duration x mins 270. This spike or signature may be compared with a signature associated with a scored bearing event to determine if the amplitude, duration and rate of change of the signature may indicate an anomaly event.

The example signature 200 of FIG. 2 is provided by way of an example only. Signatures associated with other power plant parameters, such as lube oil temperature, seismic vibration, proximity vibration, drain oil temperature may also be determined.

Referring now to FIG. 3, according to an example embodiment of the disclosure 300 indicates three operating scenarios for a signature event associated with an anomaly in the power plant component 110. The first operating scenario indicates a startup 310, which shows a temperature 350, which may be a bearing temperature, increasing with time during a startup transient. In this case, the region of comparison 1 360 between the signature for the startup 310 with a threshold signature may determine if an anomalous event occurred in the bearing. In this case, the temperature gradient associated with the startup 310 event can be taken into consideration in the algorithm to determine the signature and perform the comparison. In another example embodiment of the disclosure, steady state 320 indicates a temperature signature, such as a bearing temperature signature, during steady operation of the bearing or turbine. In this case, the region for comparison 2 370 only has the magnitude of the temperature and the duration of the spike to be taken into account for the comparison. Lastly, during a shutdown transient 330, the region for comparison 3 380 may take into account both the magnitude and duration of the signature or spike, as well as the temperature drop due to the shutdown process.

Referring now to FIG. 4, a flow diagram of an example method 400 for bearing health monitoring in power plants is shown, according to an example embodiment of the disclosure. The method 400 may be utilized in association with various systems, such as the system 100 illustrated in FIG. 1, the signature detection module 160 illustrated in FIG. 1, and/or the control system 150 illustrated in FIG. 5.

The method 400 may begin at block 405. At block 405, operational data 120 associated with a power plant component 110 may be received. Next, at block 410, the method 400 may include receiving training data 130 from one or more power plants. At block 415, the method 400 may further include determining a signature associated with an anomaly event of the power plant component 110, based at least in part on the operational data 120 and the training data 130. The anomaly event may include a wiping of a bearing or a scoring of the bearing. Next at block 420, the method 400 may further include comparing the signature to a threshold signature. If the signature matches the threshold signature within a predetermined magnitude and duration limits, at block 425, the method 400 can include generating an alert indicative of the anomaly event associated with the power plant component 110. If the signature does not match the threshold signature within a predetermined magnitude and duration limits, at block 430, the method 400 can include generating an alert to modify an inspection interval for the power plant component 110. Further at block 435, the method 400 can include identifying a repair or inspection recommendation for the power plant component 110.

Attention is now drawn to FIG. 5, which illustrates an example controller 150 configured for implementing certain systems and methods for bearing health monitoring in power plants in accordance with certain embodiments of the disclosure. The controller can include a processor 505 for executing certain operational aspects associated with implementing certain systems and methods bearing health monitoring in power plants in accordance with certain embodiments of the disclosure. The processor 505 can be capable of communicating with a memory 525. The processor 505 can be implemented and operated using appropriate hardware, software, firmware, or combinations thereof. Software or firmware implementations can include computer-executable or machine-executable instructions written in any suitable programming language to perform the various functions described. In one embodiment, instructions associated with a function block language can be stored in the memory 525 and executed by the processor 505.

The memory 525 can be used to store program instructions that are loadable and executable by the processor 505 as well as to store data generated during the execution of these programs. Depending on the configuration and type of the controller 150, the memory 525 can be volatile (such as random access memory (RAM)) and/or non-volatile (such as read-only memory (ROM), flash memory, etc.). In some embodiments, the memory devices can also include additional removable storage 530 and/or non-removable storage 535 including, but not limited to, magnetic storage, optical disks, and/or tape storage. The disk drives and their associated computer-readable media can provide non-volatile storage of computer-readable instructions, data structures, program modules, and other data for the devices. In some implementations, the memory 525 can include multiple different types of memory, such as static random access memory (SRAM), dynamic random access memory (DRAM), or ROM.

The memory 525, the removable storage 530, and the non-removable storage 535 are all examples of computer-readable storage media. For example, computer-readable storage media can include volatile and non-volatile, removable and non-removable media implemented in any method or technology for storage of information such as computer-readable instructions, data structures, program modules or other data. Additional types of computer storage media that can be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tapes, magnetic disk storage or other magnetic storage devices, or any other medium which can be used to store the desired information and which can be accessed by the devices. Combinations of any of the above should also be included within the scope of computer-readable media.

Controller 150 can also include one or more communication connections 510 that can allow a control device (not shown) to communicate with devices or equipment capable of communicating with the controller 150. The controller can also include a computer system (not shown). Connections can also be established via various data communication channels or ports, such as USB or COM ports to receive cables connecting the controller 150 to various other devices on a network. In one embodiment, the controller 150 can include Ethernet drivers that enable the controller 150 to communicate with other devices on the network. According to various embodiments, communication connections 510 can be established via a wired and/or wireless connection on the network.

The controller 150 can also include one or more input devices 515, such as a keyboard, mouse, pen, voice input device, gesture input device, and/or touch input device. It can further include one or more output devices 520, such as a display, printer, and/or speakers.

In other embodiments, however, computer-readable communication media can include computer-readable instructions, program modules, or other data transmitted within a data signal, such as a carrier wave, or other transmission. As used herein, however, computer-readable storage media do not include computer-readable communication media.

Turning to the contents of the memory 525, the memory 525 can include, but is not limited to, an operating system (OS) 526 and one or more application programs or services for implementing the features and aspects disclosed herein. Such applications or services can include a signature detection module 160 for executing certain systems and methods bearing health monitoring in power plants. The signature detection module 160 can reside in the memory 525 or can be independent of the controller 150, as represented in FIG. 1. In one embodiment, the signature detection module 160 can be implemented by software that can be provided in configurable control block language and can be stored in non-volatile memory. When executed by the processor 505, the signature detection module 160 can implement the various functionalities and features associated with the controller 150 described in this disclosure.

As desired, embodiments of the disclosure may include a controller 150 with more or fewer components than are illustrated in FIG. 5. Additionally, certain components of the controller 150 of FIG. 5 may be combined in various embodiments of the disclosure. The controller 150 of FIG. 5 is provided by way of example only.

References are made to block diagrams of systems, methods, apparatuses, and computer program products according to example embodiments. It will be understood that at least some of the blocks of the block diagrams, and combinations of blocks in the block diagrams, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a non-transitory computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide task, acts, actions, or operations for implementing the functions specified in the block or blocks.

One or more components of the systems and one or more elements of the methods described herein may be implemented through an application program running on an operating system of a computer. They also may be practiced with other computer system configurations, including handheld devices, multiprocessor systems, microprocessor based or programmable consumer electronics, mini-computers, mainframe computers, and the like.

Application programs that are components of the systems and methods described herein may include routines, programs, components, data structures, and so forth that implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks may be performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated that the disclosure may be embodied in many forms and should not be limited to the example embodiments described above.

Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A computer-implemented method comprising:
   receiving operational data associated with a power plant component;
   receiving training data from one or more power plants;
   based at least in part on the operational data and the training data, determining a signature associated with an anomaly event of the power plant component, wherein the anomaly event comprises: a wiping of a bearing or a scoring of a bearing, wherein determining the signature associated with an anomaly event of the power plant component comprises:
    filtering bad quality data from the operational data associated with the power plant component using one or more low pass filters or turbine load;
    removing false signature data using drain oil temperature data and turbine speed data;
    implementing one or more low pass filters on the operational data;
    determining one or more shift detection scores;
    based at least in part on the one or more shift detection scores, determining a superimposed shift detection score;
    separately analyzing the superimposed shift detection score using at least one of a step detection algorithm, a ramp detection algorithm, or a spike detection algorithm; and
    determining the signature associated with the anomaly event;
based at least in part on a comparison of the signature with a threshold signature, generating (1) an alert indicative of the anomaly event or (2) an alert to modify an inspection interval for the power plant component; and
based at least in part on the comparison, generating a repair or inspection recommendation for the power plant component.

2. The computer-implemented method of claim 1, wherein the power plant component comprises at least one of the following: a bearing associated with a gas turbine, a bearing associated with a steam turbine, a bearing associated with a generator, or a bearing associated with a reciprocating engine.

3. The computer-implemented method of claim 1, wherein either the operational data or the training data comprise at least one of the following: bearing metal temperature data, lube oil temperature data, drain oil temperature data, seismic vibration data, proximity vibration data, turbine power output, turbine speed or signature threshold data.

4. The computer-implemented method of claim 1, wherein either the operational data associated with the power plant component or the training data from one or more power plants comprise at least one of the following: discrete data or time series data.

5. The computer-implemented method of claim 1, wherein the signature is characterized by parameters comprising: a length parameter, a height parameter, or a rate of change parameter.

6. The computer-implemented method of claim 1, wherein determining the signature associated with an anomaly event of the power plant component comprises: determining the signature on a real-time continuous basis or determining the signature on a discrete time interval basis.

7. A system comprising:
    a processor; and
    a memory comprising computer-executable instructions operable to:
    receive, via the processor, operational data associated with a power plant component;
    receive, via the processor, training data from one or more power plants;
    based at least in part on the operational data and the training data, determine, via the processor, a signature associated with an anomaly event of the power plant component, wherein the computer-executable instructions operable to determine the signature associated with an anomaly event of the power plant component are further operable to:
        filter bad quality data from the operational data associated with the power plant component using one or more low pass filters or turbine load;
        remove false signature data using drain oil temperature data;
        implement one or more low pass filters on the operational data;
        determine one or more shift detection scores;
        based at least in part on the one or more shift detection scores, determine a superimposed shift detection score;
        separately analyze the superimposed shift detection score using at least one of a step detection algorithm, a ramp detection algorithm, or a spike detection algorithm; and
        wherein the anomaly event comprises: a wiping of a bearing a scoring of a bearing;
    based at least in part on a comparison of the signature with a threshold signature, generate (1) an alert indicative of the anomaly event or (2) an alert to modify an inspection interval for the power plant component; and
    based at least in part on the comparison, generate a repair or inspection recommendation for the power plant component.

8. The system of claim 7, wherein the power plant component comprises at least one of the following: a bearing associated with a gas turbine, a bearing associated with a steam turbine, a bearing associated with a generator, or a bearing associated with a reciprocating engine.

9. The system of claim 7, wherein either the operational data or the training data comprise at least one of the following: bearing metal temperature data, lube oil temperature data, drain oil temperature data, seismic vibration data, proximity vibration data, turbine power output, turbine speed or signature threshold data.

10. The system of claim 7, wherein either the operational data associated with the power plant component or the training data from one or more power plants comprise at least one of the following: discrete data or time series data.

11. The system of claim 7, wherein the signature is characterized by parameters comprising: a length parameter, a height parameter, or a rate of change parameter.

12. The system of claim 7, wherein the computer-executable instructions operable to determine the signature associated with an anomaly event of the power plant component are further operable to: determine the signature on a real-time continuous basis or determine the signature on a discrete time interval basis.

13. A non-transitory computer readable storage medium having stored instructions executable by a computer for performing operations comprising:
    receiving operational data associated with a power plant component;
    receiving training data from one or more power plants;
    based at least in part on the operational data and the training data, determining a signature associated with an anomaly event of the power plant component, wherein the anomaly event comprises: a wiping of a bearing or a scoring of the bearing;
    filtering bad quality data from the operational data associated with the power plant component using one or more low pass filters or turbine load;
    removing false signature data using drain oil temperature data;

implementing one or more low pass filters on the operational data;

determining one or more shift detection scores;

based at least in part on the one or more shift detection scores, determining a superimposed shift detection score;

separately analyzing the superimposed shift detection score using at least one of a step detection algorithm, a ramp detection algorithm, or a spike detection algorithm;

determining the signature associated with the anomaly event;

based at least in part on a comparison of the signature with a threshold signature, generating (1) an alert indicative of the anomaly event or (2) an alert to modify an inspection interval for the power plant component; and identifying a repair or inspection recommendation for the power plant component.

14. The non-transitory computer readable storage medium of claim 13, wherein the power plant component comprises: a bearing associated with a gas turbine, a bearing associated with a steam turbine, a bearing associated with a generator, or a bearing associated with a reciprocating engine.

15. The non-transitory computer readable storage medium of claim 13, wherein either the operational data or the training data comprise: bearing metal temperature data, lube oil temperature data, drain oil temperature data, seismic vibration data, proximity vibration data, turbine power output, turbine speed or signature threshold data.

16. The non-transitory computer readable storage medium of claim 13, wherein either the operational data associated with the power plant component or the training data from one or more power plants comprise discrete data and time series data.

17. The non-transitory computer readable storage medium of claim 13, wherein the signature is characterized by parameters comprising: a length parameter, a height parameter, or a rate of change parameter.

* * * * *